United States Patent
Wakamatsu et al.

(10) Patent No.: US 6,638,447 B2
(45) Date of Patent: Oct. 28, 2003

(54) PREPARATION METHOD OF RARE EARTH ACTIVATED ALKALINE EARTH METAL FLUOROHALIDE STIMULABLE PHOSPHOR AND RADIOGRAPHIC IMAGE CONVERSION PANEL

(75) Inventors: Hideaki Wakamatsu, Hino (JP); Hiroto Itoh, Hino (JP); Hiroyuki Nabeta, Hino (JP); Kanae Kawabata, Hino (JP)

(73) Assignee: Konica Corporation (JP)

( * ) Notice: Subject to any disclaimer, the term of this patent is extended or adjusted under 35 U.S.C. 154(b) by 148 days.

(21) Appl. No.: 09/838,856

(22) Filed: Apr. 20, 2001

(65) Prior Publication Data

US 2002/0001669 A1 Jan. 3, 2002

(30) Foreign Application Priority Data

May 16, 2000 (JP) ........................................ 2000-143178

(51) Int. Cl.⁷ ........................... C09K 11/61; C09K 11/55
(52) U.S. Cl. ................................................ 252/301.4 H
(58) Field of Search ..................... 252/301.4 H, 301.4 R

(56) References Cited

U.S. PATENT DOCUMENTS 6,168,730 B1 * 1/2001 Nabeta et al. ....... 252/301.4 H
6,444,142 B1 * 9/2002 Matsumoto et al. . 252/301.4 H

FOREIGN PATENT DOCUMENTS

| JP | 233369 | 9/1995 |
| JP | 291278 | 11/1997 |
| JP | 1088125 | 4/1998 |

* cited by examiner

Primary Examiner—C. Melissa Koslow
(74) Attorney, Agent, or Firm—Muserlian, Lucas and Mercanti

(57) ABSTRACT

A preparation method of an oxygen-introduced rare earth activated alkaline earth metal fluorohalide stimulable phosphor is disclosed, comprising (a) preparing a reactant solution having a barium concentration of not less than 3.3 mol/l in a reaction vessel, (b) forming a precursor of the stimulable phosphor, and (c) removing a solvent from a mother liquor.

20 Claims, No Drawings

PREPARATION METHOD OF RARE EARTH ACTIVATED ALKALINE EARTH METAL FLUOROHALIDE STIMULABLE PHOSPHOR AND RADIOGRAPHIC IMAGE CONVERSION PANEL

FIELD OF THE INVENTION

The present invention relates to rare earth activated alkaline earth metal fluoroiodide stimulable phosphors, a preparation method of the stimulable phosphors and a radiographic image conversion panel.

BACKGROUND OF THE INVENTION

As an effective means for replacing conventional radiography known is a recording and reproducing method of radiation images using stimulable phosphors described in JP-A No. 55-12148 (hereinafter, the term, JP-A refers to an unexamined and published Japanese Patent Application). In the method, a radiographic image conversion panel (hereinafter, also simply denoted as panel) comprising a stimulable phosphor is employed, and the method comprises the steps of causing the stimulable phosphor of the panel to absorb radiation having passed through an object or having been radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electrical signals, and reproducing the radiation image of the object as a visible image from the electrical signals. The panel, having been read out, is then subjected to image-erasing and prepared for the next photographing cycle. Thus, the radiographic image conversion panel can be used repeatedly.

In the radiation image recording and reproducing methods described above, a radiation image is advantageously obtained with a sufficient amount of information by applying radiation to an object at a considerably smaller dose, as compared to conventional radiography employing a combination of a radiographic film and a radiographic intensifying screen. Further, in conventional radiography, the radiographic film is consumed for every photographing; on the other hand, in this radiation image converting method, in which the radiographic image conversion panel is employed repeatedly, is also advantageous in terms of conservation of resources and overall economic efficiency.

The radiographic image conversion panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiographic image conversion panel in which a polymeric material is contained in the openings among the aggregated stimulable phosphor. On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

The stimulable phosphor, after being exposed to radiation, produces stimulated emission upon exposure to the stimulating ray. In practical use, phosphors are employed, which exhibit an emission within a wavelength region of 300 to 500 nm stimulated by stimulating light of wavelengths of 400 to 900 nm. Examples of such stimulable phosphors include rare earth activated alkaline earth metal fluorohalide phosphors described in JP-A Nos. 55-12145, 55-160078, 56-74175, 56-116777, 57-23673, 57-23675, 58-206678, 59-27289, 59-27980, 59-56479 and 59-56480; bivalent europium activated alkaline earth metal fluorohalide phosphors described in JP-A Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in JP-A 59-12144; cerium activated trivalent metal oxyhalide phosphors described in JP-A No. 55-69281; bismuth activated alkaline metal halide phosphors described in JP-A No. 60-70484; bivalent europium activated alkaline earth metal halophosphate phosphors described in JP-A Nos. 60-141783 and 60-157100; bivalent europium activated alkaline earth metal haloborate phosphors described in JP-A No. 60-157099; bivalent europium activated alkaline earth metal hydrogenated halide phosphors described in JP-A 60-217354; cerium activated rare earth complex halide phosphors described in JP-A Nos. 61-21173 and 61-21182; cerium activated rare earth halophosphate phosphors described in JP-A No. 61-40390; bivalent europium activated cesium rubidium halide phosphors described in JP-A No .60-78151; bivalent europium activated cerium halide rubidium phosphors described in JP-A No. 60-78151; bivalent europium activated composite halide phosphors described in JP-A No. 60-78153. Specifically, iodide-containing bivalent europium activated alkaline earth metal fluorohalide phosphors, iodide containing rare earth activated oxyhalide phosphors and iodide containing bismuth activated alkaline earth metal halide phosphors exhibited stimulated emission of high luminance.

Along with the spread of radiographic image conversion panels employing stimulable phosphors is further desired an enhancement of radiation image quality, such as enhancement in sharpness and graininess.

The foregoing preparation methods of stimulable phosphors are called a solid phase process or calcination method, in which pulverization after calcination is indispensable, however, there were problems such that it was difficult to control the particle form affecting sensitivity and image performance. Of means for enhancing image quality of radiation images is valid preparation of fine particles of a stimulable phosphor and enhancing particle size uniformity of the fine stimulable phosphor particles, i.e., narrowing the particle size distribution.

Preparation of stimulable phosphors in the liquid phase described in JP-A 7-233369 and 9-291278 is a method of obtaining a stimulable phosphor precursor in the form of fine particles by adjusting the concentration of a phosphor raw material solution, which is valid as a method of preparing stimulable phosphor powder having a narrow particle size distribution. Of rare earth activated alkaline earth metal fluorohalide stimulable phosphors, a phosphor having higher iodide content is preferred in terms of reduction of radiation exposure. This is due to the fact that iodine exhibits a higher X-ray absorption than bromine.

Alkaline earth metal fluoroiodide stimulable phosphors prepared in the liquid phase are advantageous in luminance and graininess but when a precursor thereof is prepared in the liquid phase, the following problems arise. Thus, as described in JP-A 9-291278 and 10-88125, the precursor crystals are prepared in such a manner that: (i) barium iodide is dissolved in water or organic solvents and to the obtained solution, an inorganic iodide solution is added with stirring; or (ii) ammonium fluoride is dissolved in water and to the obtained solution, a barium iodide solution is added with stirring. However, in (i), low barium iodide needs to be present in excess in the solution and the stoichiometric ratio of barium iodide to barium fluoroiodide obtained after solid-liquid separation to added barium iodide often exhibits as small a value as 0.4 or so. Thus, the yield of an alkaline earth metal fluoroiodide stimulable phosphor is often about 40% of the added barium iodide. Even in (ii), excess barium iodide is needed for inorganic fluoride and the yield is also low. Thus, there are problems that the liquid phase synthesis of barium fluoroiodide results in a lower yield, consequently leading to lowered productivity. Reducing the concentration of barium iodide in the mother liquor to enhance the yield results in an increase of particle size, leading to deteriorated image quality.

To enhance the yield of a rare earth activated alkaline earth metal stimulable phosphor, specifically, an alkaline earth metal fluoroiodide stimulable phosphor, JP-A 11-29324 discloses a method for obtaining cubic or rectangular rare earth element-containing barium fluoroiodide crystals having a basic composition of BaFI:xLn (in which Ln: is at least a rare earth element selected from Ce, Pr, Sm, Eu, Gd, Tb, Tm and Yb, $0<x\leq 0.1$) which is obtained by adding a fluorine source to the mother liquor and concentrating the solution. As a result of the study by the inventors of this application, however, it was proved that although cubic or rectangular BaFI crystals were formed, the concentration by spontaneous evaporation markedly lowered its productivity and was industrially unacceptable. It was further proved that the thus obtained cubic or rectangular crystal particles exhibited larger sizes and the particle size distribution was rather broad, leading to deteriorated image characteristics which was unacceptable in practical use.

SUMMARY OF THE INVENTION

It is an object of the present invention to obtain a rare earth activated alkaline earth metal fluorohalide stimulable phosphor exhibiting enhanced uniformity in particle size at high productivity, to obtain a rare earth activated alkaline earth metal fluorohalide stimulable phosphor exhibiting enhanced uniformity in fine particle size and enhanced productivity, and to provide a radiographic image conversion panel exhibiting enhanced sensitivity and superior image quality, by the use of the rare earth activated alkaline earth metal fluorohalide stimulable phosphor.

The object of the present invention can be accomplished by the following constitution:

A method for preparing a rare earth activated alkaline earth metal fluorohalide stimulable phosphor represented by the following formula (I)

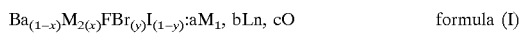

wherein $M_1$ is at least an alkali metal selected from the group consisting of Li, Na, K, Rb and Cs; $M_2$ is at least an alkaline earth metal selected from the group consisting of Be, Mg, Ca and Sr; Ln is at least one rare earth element selected from the grouo consisting of Ce, Pr, Sm, Eu, Gd, Tb, Tm, Dy, Ho, Nd, Er and Yb; and x, y, a, b and c are values meeting the following conditions:

$0\leq x\leq 0.3$, $0\leq y\leq 0.3$, $0\leq a\leq 0.05$ $0<b\leq 0.2$ and $0\leq c\leq 0.1$.

the method comprising:
(a) preparing a solution having a barium concentration of not less than 3.3 mol/l in a reaction vessel,
(b) causing the solution to perform reaction to form a precursor of the stimulable phosphor, and
(c) removing a solvent from a reaction mother liquor.

Further, it is preferred that the ratio by weight of the reaction mixture after removal of the solvent to that before the removal is not more than 0.97; the reaction mixture is heated to remove a reaction solvent and other means for removing other solvent(s) is employed singly or in combination; it is preferred that the reaction vessel is maintained under reduced pressure to remove the reaction solvent, a dry gas is allowed to pass through to remove solvents, the solution forms a wetted wall during removal of the solvents, and/or an alkali metal halide is added to the reaction mother liquor in advance, preferably in an amount of 0.1 to 4 mol/l.

A rare earth activated alkaline earth metal fluorohalide stimulable phosphor obtained according to the foregoing preparation method and a radiographic image conversion panel comprising a phosphor layer containing the rare earth activated alkaline earth metal fluorohalide stimulable phosphor also achieve the object of this invention.

EMBODIMENTS OF THE INVENTION

Representative embodiments of the preparation method of a rare earth activated alkaline earth metal fluorohalide stimulable phosphor according to this invention will now be described.

The preparation method of a stimulable phosphor precursor described in JP-A 10-140148 and the apparatus for preparing a phosphor precursor described in JP-A 10-147778 are preferably applicable to preparing a stimulable phosphor precursor by a liquid phase. The stimulable phosphor precursor refers to the state at which a material represented by the foregoing formula (I) has not yet been subjected to a temperature of 400° C. or higher and the stimulable phosphor precursor emits neither stimulated emission nor instantaneous emission.

In the method of synthesizing a precursor of a stimulable phosphor represented by formula (I) through the liquid phase process, at least a barium component and an inorganic fluoride preferably are present in the liquid phase. In this case, it is also preferred to start the solvent removal immediately after the barium component and inorganic fluoride are allowed to be present. The order of addition of the barium component and inorganic fluoride is not specifically limited but it is preferred to finally add the inorganic fluoride. The order of adding other components constituting the stimulable phosphor represented by formula (I) is not specifically limited. Thus, they may be added into a liquid phase or added when subjected calcination.

In this invention, the precursor is preferably prepared by the liquid phase synthesis. The rare earth activated alkaline earth metal fluorohalide stimulable phosphor is preferably prepared through the liquid phase process in which the particle size can be easily controlled, rather than through the solid phase process in which control of the particle form is difficult. It is specifically preferred to prepare stimulable phosphors through the liquid phase process.

Thus, the method comprises the steps of:
preparing within a reaction vessel an aqueous mother liquor having a barium concentration of at least 3.3 mol/l (preferably, at least 3.5 mol/l) and a halide of Ln, provided that when "x" of the formula (I) is not zero, the mother liquor further contains a halide of $M_2$ and when "y" of the formula (I) is not zero, the mother liquor further contains $BaBr_2$ and a halide of $M_1$;

adding an aqueous solution containing a 5 mol/l or more (preferably not less than 8 mol/l) of inorganic fluoride (preferably, ammonium fluoride or alkali metal fluoride) into the mother liquor, while maintaining the mother liquor at 50° C. or more, preferably, 80° C. or more (and in this case, the upper limit of the temperature is 100° C.), to form a crystalline precipitate of a precursor of a rare earth activated alkaline earth metal fluorohalide stimulable phosphor;

removing a solvent from the reaction mother liquor with adding the inorganic fluoride or after completion of the addition;

separating the crystalline precipitate of the precursor from the mother liquor; and calcining the separated precursor precipitates with avoiding sintering.

The upper limit of the barium concentration is preferably 5 mol/l. The inorganic fluoride concentration is preferably not less than 12 mol/l and its upper limit is 15 mol/l.

The (crystalline) precursor particles relating to this invention preferably have an average particle size of 1 to 10 μm and monodisperse, more preferably an average particle size of 1 to 5 μm and a coefficient of variation of particle size of not more than 20%, and still more preferably an average particle size of 1 to 3 μm and a coefficient of variation of particle size of not more than 15%. In this invention, the average particle size refers to an average sphere equivalent diameter of 200 particles which have been randomly selected from electron micrographs of such particles.

Next, preparation of stimulable phosphors will be detailed. Thus, crystalline precipitates of a phosphor precursor and a stimulable phosphor can be prepared as follows.

Initially, material(s) except for a fluoride compound are dissolved in an aqueous medium. Thus, $BaI_2$ and a halide of Ln (and if necessary, a halide of $M^2$ and a halide of $M_1$) are each added into an aqueous solvent and dissolved with stirring to prepare an aqueous solution. The amounts of $BaI_2$ and the aqueous solvent are pre-adjusted so as to have 3.3 mol/l or more (and preferably 3.5 mol/l or more) of a concentration of $BaI_2$. Insufficient barium concentrations do not form a precursor with the intended composition or forms precursor particles with excessively larger sizes even if obtained. As a result of studies by the inventors, it was proved that fine precursor particles can be obtained at a concentration of 3.3 mol/l or more. A small amount of acid, ammonia, alcohol, water-soluble polymer or fine grained powder of water-insoluble metal oxide may be added thereto. It is also preferred that lower alcohols (e.g., methanol, ethanol) are added within a range which markedly lowers the solubility of $BaI_2$. The solution (reaction mother liquor) is maintained at not less than 50° C., and preferably not less than 80° C. In this case, the upper limit is 100° C.

Next, into the reaction mother liquor maintained at 50° C. or more with stirring, an aqueous solution of an inorganic fluoride (such as ammonium fluoride or alkali metal fluoride) is introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by the formula (I). When adding an aqueous inorganic fluoride solution, the reaction mixture is preferably maintained at a temperature of 50° C. or more, and more preferably 80° C. or more.

Then, solvent is removed from the reaction mixture. Removal of the solvent from the reaction mixture does not include spontaneous evaporation of the solvent. Thus, it refers to removing a solvent by intentionally providing the process of removing the solvent at a speed exceeding spontaneous evaporation by air drying. Removal by spontaneous evaporation is not excluded in the solvent removing process of this invention but removal by spontaneous evaporation alone is not included in this invention. The timing of removing the solvent is not specifically limited but the removal is preferably conducted immediately after starting addition of an inorganic fluoride solution and before separating precipitates (of the precursor). The expression "immediately after starting addition" means during the addition or completion of the addition. The solvent removal may be conducted at one time or separately at a few times, or continuously. For example, (i) after completion of the addition of the inorganic fluoride solution, the solvent removal is conducted and then the reaction mixture is allowed to stand; (ii) after completion of the addition of the inorganic fluoride solution, the first solvent removal is carried out and allowing the reaction mixture to stand, the second solvent removal is carried out and then the reaction mixture is allowed to stand; and (iii) after completion of the addition of the inorganic fluoride solution, the solvent removal is continuously carried out until separating precipitates. The solvent removal is carried out immediately after and more preferably immediately after completion of the addition of the inorganic fluoride solution.

The solvent of this invention is the same as defined in the art and a constituent used for solving solute(s). In this invention, for example, the solute(s) include a raw material, an intermediate and a catalyst used in preparation of the stimulable phosphor represented by formula (I). In cases where plural solvents are used in the method of this invention, the removal include that of the plural solvents.

It is preferred to remove a solvent in an amount of not less than 3%, and more preferably not less than 5% of the weight of the reaction mother liquor before being removed. Thus, the weight ratio of the reaction mother liquor after solvent removal to before solvent removal is preferably not more than 0.97 and more preferably not more than 0.95. It is also preferred to remove a solvent in an amount of not more than 50%, more preferably not more than 30%, and still more preferably not more than 20% of the weight of the reaction mother liquor before being removed. Thus, the weight ratio of the reaction mixture after solvent removal to before solvent removal is preferably not less than 0.50, more preferably not less than 0.70 and still more preferably not less than 0.80. Herein, the expression "after solvent removal" means "after completion of the solvent removal". Excessive removal results in excessively increased viscosity of the reaction mixture, often producing troubles in handling. The time required for solvent removal largely affects not only productivity but also the particle shape and the particle size distribution, so that an optimal removal method is selected. The solvent removal per unit area is carried out preferably at a rate of 2.0 to 20.0 kg/(m²·hr), and more preferably 3.0 to 10.0 kg/(m²·hr). The (unit) area is that of the reaction mixture in contact with the atmosphere. In general, the reaction mixture is heated to evaporate a solvent and this method is also beneficial in this invention. A precursor having the intended composition can be obtained by the optimal solvent removal. The expression, being heated means that the reation mixture maintained at a temperature before the solvent is removed or heated to a temperature higher than that before the solvent is removed, during the solvent removal. In this invention, it is preferred to heat the reaction mixture so as to maintain the reaction mixture at 50 to 80° C.

Another method of removing a solvent is preferably employed in combination to enhance productivity and retain optimal particle shape. The use of a separation membrane such as a reverse osmosis membrane can also be selected. In this invention, the following removing methods are preferred in terms of productivity.

1. Dry Gas Aeration

In a closed reaction vessel, two or more openings are provided, through which dry gas is allowed to pass. Any gas is optionally selected but common air or nitrogen is preferred in terms of safety. The solvent is removed concomitantly with the aerating gas, depending on the saturated water vapor content in the gas. Besides permeating through openings in the reaction vessel, it is useful to allow the gas to bubble through a liquid phase to cause the solvent to be absorbed into the bubbles.

2. Evacuation

As is well known, vapor pressure is lowered by evacuation. Thus, a solvent is efficiently removed under reduced pressure. The extent of the reduced pressure is optimally selected, depending on the kind of solvent. In cases where water is used as a solvent, for example, the reduced pressure is preferably not more than 86,450 Pa.

3. Liquid Membrane

Removal of a solvent can be efficiently effected by enlarging the vaporization area. In cases when undergoing reaction by heating with stirring in a reaction vessel of a given volume, heating is generally done in such a manner that a heating means is immersed into the liquid or is provided outside the vessel. In this case, the heat transfer area is limited to the portion of the heating means in contact with the liquid, so that the heat transfer area decreases with removal of the solvent, retarding removal of the solvent. To prevent such retardation, using a pump or a stirrer, the reaction solution is sprayed onto the wall of the reaction vessel to increase the heat transfer area. This method of spraying liquid onto the wall of the reaction vessel to form a liquid membrane is known as a wetted wall method. The wetted wall can be formed not only using a pump but also using a stirrer described in JP-A 6-335627 and 11-235522.

These methods are employed alone or in combination. Examples thereof include the combination of the formation of the wetted wall and maintaining the reaction vessel under the reduced pressure and the combination of the formation of the wetted wall and dry gas aeration. Of these, the former is preferred, as described in JP-A 6-335627.

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Further, the phosphor precursor crystals are charged into a heat-resistant vessel such as a silica port, an alumina crucible or a silica crucible and then placed in the core portion of an electric furnace to be calcined, without causing the crystals to sinter. The furnace core of an electric furnace is limited to those in which the atmosphere is replaceable during calcination. Preferably employed as the furnace is a moving bed type electric furnace, such as a rotary kiln. As a calcination atmosphere is employed a nitrogen gas atmosphere, a neutral atmosphere such as an argon gas atmosphere, a nitrogen gas atmosphere containing a small amount of hydrogen gas, a weakly reducible atmosphere such as a carbon dioxide atmosphere containing carbon monoxide, or a trace amount of oxygen-introduced atmosphere. Calcination is effected preferably employing the method described in JA-A 2000-8034. Suitably, the separated precipitate of the precursor is calcined at a temperature of 400° C. to 1300° C. for a period of 0.5 to 12 hours. Thus, a rare earth activated alkaline earth metal fluorohalide stimulable phosphor can be obtained through the calcination described above.

Preparation of Radiographic Image Conversion Panel

As supports used in the radiographic image conversion panel according to the invention are employed a various types of polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 10 to 1000 $\mu$m and preferably 10 to 500 $\mu$m in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butyrate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound(s) are uniformly dispersed in a binder solution.

In this invention, film-making binders used in the conventional layer constitution are usable as a binder in this invention, including proteins such as gelatin, polysaccharides such as dextrin or Arabic gum, polyvinyl butyral, polyvinyl acetate, nitrocellulose, ethyl cellulose, vinylidene chloride/vinyl chloride copolymer, polymethyl methacrylate, vinyl chloride/vinyl acetate copolymer, polyurethane, cellulose acetate butylate, and polyvinyl alcohol. The binder is employed in an amount of 0.01 to 1 part by weight per 1 part by weight of the stimulable phosphor. A smaller amount of the binder is preferred in terms of sensitivity and sharpness of the radiographic image conversion panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiographic image conversion panel, the kind of the phosphor and an addition amount of the epoxy group-containing compound. Examples of solvents used for preparing the coating solution include lower alcohols such as methanol, ethanol, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

Examples of solvents used for the coating solution of the stimulable phosphor layer include lower alcohols such as methanol, ethanol 1-propanol and butanol; ketones such as acetone, methyl ethyl ketone, methyl isobutyl ketone and cyclohexanone; esters a lower fatty acid and a lower alcohol, such as methyl acetate, ethyl acetate and butyl acetate; ethers such as dioxane, ethylene glycol monoethyl ether and ethylene glycol monomethyl ether.tolyol; aromatic compounds such as tolyol and xylol; halogenated hydrocarbons such as methylene chloride and ethylene chloride; and their mixtures.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

The coating solution as prepared above was uniformly coated on the surface of the subbing layer to form a coating layer. Coating can be carried out by conventional coating means, such as doctor blade, roll coater and knife coater. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. The thickness of the stimulable phosphor layer, depending on characteristics of the radiographic image conversion panel, the kind of stimulable phosphors and the mixing ratio of a binder to phosphor, is preferably 10 to 1,000 $\mu$m, and more preferably 10 to 500 $\mu$m.

Examples of an europium activated barium fluoroiodide stimulable phosphor have been described so far but a europium activated barium fluorobromide stimulable phosphor and other stimulable phosphors represented by formula (I) can also be prepared similarly to the methods described above.

EXAMPLES

The present invention will be described based on examples.

Example 1

To synthesize a precursor of europium activated barium fluoroiodide stimulable phosphor, 2500 ml of an aqueous $BaI_2$ solution (having a concentration of 4 mol/l) and 26.5 ml of $EuI_3$ solution (having a concentration of 0.2 mol/l) were added to a pressure reaction vessel provided with two openings. Reaction mother liquor was maintained at 83° C. with stirring. Then, 600 ml of aqueous ammonium fluoride solution (10 mol/l) was added to the mother liquor using a roller pump to form precipitates. After completing addition, the reaction mixture was aerated with dry air at a rate of 10 lit./min. for 20 min. The weight ratio of the mother liquor after aeration to that before aeration was 0.94. Stirring further continued for 90 min at the same temperature, while closing the reaction vessel and then the reaction mixture was filtered and the precipitate was washed with 2000 ml of ethanol. The thus obtained precipitate of a phosphor precursor was weighed to determine the yield by comparing the theoretical yield obtained from the added barium amount. The precipitate was subjected to X-ray diffractometry using Cu-K$\alpha$ line. The average particle size of the precipitate was also determined.

Example 2

The precipitate was obtained similarly to Example 1 provided that after adding ammonium fluoride, the pressure within the reaction vessel was reduced to 74,480 Pa using a circulating aspirator to remove a solvent under reduced pressure. After evacuation over 15 min., the mother liquor weight ratio of after to before evacuation was 0.92. The yield was determined, and X-ray diffractometry and the determination of the average particle size were done similarly to Example 1.

Example 3

The precipitate was obtained similarly to Example 1 provided that after adding ammonium fluoride, the reaction solution was sprayed onto the wall of the reaction vessel by a pump to allow a solvent to vaporize from the liquid membrane. After conducting this procedure over 15 min., the mother liquor weight ratio of after to before evacuation was 0.94. The yield was determined, and X-ray diffractometry and the determination of the average particle size were done similarly to Example 1.

Comparative Example 1

To synthesize a precursor of europium activated barium fluoroiodide stimulable phosphor, 2500 ml of an aqueous $BaI_2$ solution (4 mol/l) and 26.5 ml of $EuI_3$ solution (0.2 mol/l) were added to a pressure reaction vessel. Further thereto, 332 g of potassium iodide was added. Reaction mother liquor was maintained at 83° C. with stirring. Then, 250 ml of aqueous ammonium fluoride solution (10 mol/l) was added to the reaction mother liquor using a roller pump to form a precipitate. After completing addition, stirring further continued for 90 min at the same temperature and then the reaction mixture was filtered and the precipitate was washed with 2000 ml of ethanol. The yield was determined, and X-ray diffractometry and the determination of the average particle size were done similarly to Example 1.

Comparative Example 2

The precipitate was obtained similarly to Comparative Example 1 provided that 600 ml of an aqueous ammonium fluoride was added. The yield was determined, and X-ray diffractometry and the determination of the average particle size were done similarly to Example 1.

Comparative Example 3

The precipitate was obtained similarly to Comparative Example 1 provided that 600 ml of an aqueous ammonium fluoride solution was added and after the addition of ammonium fluoride, the reaction was concentrated by spontaneous evaporation over 15 hrs. The weight ratio of the mother liquor after aeration to that before aeration was 0.89. The yield was determined, and X-ray diffractometry and the determination of the average particle size were done similarly to Example 1.

Example 4

The precipitate was obtained similarly to Comparative Example 1 provided that the amount of potassium iodide was changed to 500 g. The yield was determined, and X-ray diffractometry and the determination of the average particle size were done similarly to Example 1.

Example 5

The precipitate was obtained similarly to Comparative Example 1 provided that potassium iodide was not added to the reaction mother liquor. The yield was determined, and X-ray diffractometry and the determination of the average particle size were done similarly to Example 1.

Example 6

The precipitate was obtained similarly to Comparative Example 1 provided that after adding ammonium fluoride, pressure within the reaction vessel was reduced to 74,480 Pa and the reaction solution was sprayed onto the wall of the reaction vessel by a pump to allow a solvent to vaporize from the liquid membrane. After conducting this procedure for concentration over 7 min., the mother liquor weight ratio of after to before concentration was 0.93. The yield was determined, and X-ray diffractometry and the determination of the average particle size were done similarly to Example 1.

Results are shown in Table 1. From the result of X-ray diffractometry, a peal at $2\theta=29.4°$ was identified to be attributed to $BaF_2$. as a by-product.

TABLE 1

| Phosphor Sample | Yield | Weight Ratio*1 | Alkali Metal Halide | $BaF_2$ Peak | Average Particle Size ($\mu$m) |
| --- | --- | --- | --- | --- | --- |
| Example 1 | 58 | 0.94 | KI | No | 3.1 |
| Example 2 | 60 | 0.92 | KI | No | 3.2 |
| Example 3 | 59 | 0.94 | KI | No | 3.0 |
| Comp. Example 1 | 25 | 1.00 | KI | No | 3.5 |
| Comp. Example 2 | 52 | 1.00 | KI | Yes | 2.7 |
| Comp. Example 3 | 57 | 0.89 | KI | No | 17.9 |
| Example 4 | 58 | 0.94 | KI | No | 3.5 |
| Example 5 | 59 | 0.94 | — | No | 3.7 |
| Example 6 | 59 | 0.93 | KI | No | 3.4 |

*1Weight ratio of mother liquor of after to before solvent removal

As apparent from Table 1, removal of a solvent from the reaction mother liquor resulted in a precursor of europium activated barium fluoroiodide stimulable phosphor with an enhanced yield, without increasing particle sizes. Prevention of an increase in particle size was markedly enhanced by the presence of a potassium ion.

Example 7

The precipitate was obtained similarly to Example 2 provided that cesium iodide was added to the reaction mother liquor, the amount of the ammonium fluoride solution added to the reaction mother liquor was 700 ml, and a solvent was removed under a reduced pressure of 21,280 Pa for 30 min. The mother liquor weight ratio of after to before solvent removal was 0.90. The yield was determined, and X-ray diffractometry and the determination of the average particle size were done similarly to Example 1.

Example 8

The precipitate was obtained similarly to Example 2 provided that cesium iodide was added to the reaction mother liquor, the amount of the ammonium fluoride solution added to the reaction mother liquor was 800 ml, and a solvent was removed under a reduced pressure of 21,280 Pa for 35 min. The weight ratio of the mother liquor after to before solvent removal was 0.88. The yield was determined, and X-ray diffractometry and the determination of the average particle size were done similarly to Example 1.

Example 9

The precipitate was obtained similarly to Example 2 provided that cesium iodide was added to change its concentration in the reaction mother liquor from 4 mol/l to 3.6 mol/l and the amount of the ammonium fluoride solution added to the reaction mother liquor was 480 ml. The weight ratio of the mother liquor after to before solvent removal was 0.97. The yield was determined, and X-ray diffractometry and the determination of the average particle size were done similarly to Example 1.

Comparative Example 4

The precipitate was obtained similarly to Example 2 provided that cesium iodide was added to change its concentration in the reaction mother liquor from 4 mol/l to 3.2 mol/l and the amount of the ammonium fluoride solution added to the reaction mother liquor was 480 ml. The weight ratio of the mother liquor after to before solvent removal was 0.98. The yield was determined, and X-ray diffractometry and the determination of the average particle size were done similarly to Example 1.

Comparative Example 5

The precipitate was obtained similarly to Comparative Example 1 provided that the concentration of the reaction mother liquor from 4 mol/l to 3.2 mol/l and the amount of the ammonium fluoride solution added to the reaction mother liquor was 200 ml. The weight ratio of the mother liquor after to before solvent removal was 0.97. The yield was determined, and X-ray diffractometry and the determination of the average particle size were done similarly to Example 1.

Results of Examples 7 through 9, and Comparative Examples 4 and 5 are shown in Table 2.

TABLE 2

| Phosphor Sample | Yield | Weight Ratio*1 | Alkali Metal Halide | $BaF_2$ Peak | Average Particle Size (μm) |
|---|---|---|---|---|---|
| Example 7 | 68 | 0.90 | CeI | No | 3.1 |
| Example 8 | 79 | 0.88 | CeI | No | 3.2 |
| Example 9 | 57 | 0.97 | CeI | No | 2.9 |
| Comp. Example 4 | 58 | 0.98 | CeI | No | 3.7 |
| Comp. Example 5 | 24 | 1.00 | CeI | No | 3.9 |

*1Weight ratio of mother liquor after to before solvent removal

As apparent from Table 2, fine particles of a stimulable phosphor precursor were obtained according to the preparation method of this invention.

Preparation of Stimulable Phosphor

Precursors of a stimulable phosphor obtained in Example 1 through 9 and Comparative Examples 1 and 3 through 5 were each treated prior to calcination. Thus, to prevent variation in grain form and grain size distribution due to sintering during calcination, super fine-grained alumina powder was added in an amount of 1% by weight and sufficiently stirred with a mixer to allow the super-fine alumina powder to uniformly be adhered onto the surface of the crystals.

A mixture of europium activated barium fluoroiodide crystalline powder and alumina super fine grains was charged into a quartz core tube with a volume of 10 liters of a batch type rotary kiln. A gas mixture comprised of 93% (by volume) of nitrogen, 5% hydrogen and 2% oxygen was flowed at a flow rate of 10 l/min. for a period of 20 min. to replace an atmosphere. After sufficiently replacing an atmosphere in the core, the flow rate of the gas mixture of 93% nitrogen, 5% hydrogen and 2% oxygen was decreased to 2 l/min. and the temperature was raised to 830° C. at a temperature increasing rate of 10° C./min. with rotating the core tube at a rate of 2 rpm. After reaching a temperature of 83° C., a gas mixture comprised of 95% nitrogen and 5% hydrogen was flowed at a flow rate of 10 l/min. for 20 min. with maintaining a temperature at 850° C. to replace an atmosphere. Thereafter, the flow rate of the gas mixture of 95% nitrogen and 5% hydrogen was decreased to 2 l/min. and the atmosphere was maintained further for 90 min. The atmosphere was cooled to 25° C. at a temperature decreasing rate of 10° C./min. and then, replaced by the air to obtain oxygen-introduced europium activated barium fluoroiodide stimulable phosphor particles.

Preparation of Radiographic Image Conversion Panel

The thus prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with 200 μm in thickness was formed.

Fluoro-resin, fluoroolefin-vinyl ether copolymer (Lumiflon LF100, trade name, produced by Asahi Glass Co.) of 70 g, cross-linking agent, isocyanate (Desmodule Z4370, trade name, produced by Sumitomo-Bayer Urethane Co.) of 25 g bisphenol A-type epoxy resin of 5 g and silicone resin fine powder (KMP-590, trade name, produced by Shinetsu Kagaku Co., average particle size of 1 to 2 μm) of 10 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there was obtained a radiographic image converting panels comprising a stimulable phosphor layer with a given thickness.

Evaluation of Radiographic Image Conversion Panel

Sensitivity

Each of the prepared radiographic image conversion panels was exposed to X-rays at 80 KVp and then excited by the light of a He—Ne laser (633 nm). Then, the stimulated emission emitted from the phosphor layer was captured by a detector (photomultiplier with a spectral sensitivity of S-5) to measure the intensity of the emission. The sensitivity is shown as a relative value in Table 3.

Sharpness

The radiation image conversion panels, each was exposed to X-rays at a tube voltage of 80 KVp through a rectangular wave chart used for MTF measurement (available from Konica Medical Co., Ltd.) and then excited by scanning with a 200 mW semi-conductor laser (780 nm). Then, the stimulated emission emitted from the phosphor layer was captured by a detector to convert electric signals, subjected to analog-digital conversion and recorded on a magnetic tape. The x-ray images recorded on the magnetic tape was analyzed by computer and represented by the modulation transfer function (MTF). The MTF was represented by percentage at a special frequency of 2 cycles/mm.

Graininess

The panel was exposed to X-rays at 80 kvp through a lead MTF chart and then excited by the He—Ne laser. Thereafter, the stimulated emission emitted from the phosphor layer was measured and converted to electric signals. The electric signals were recorded on a conventional photographic film through a film scanner and the resulting photographic image was visually evaluated with respect to graininess, by comparison to the graininess of a conventional X-ray photographic image (hereinafter, denoted as an S/F image), which was obtained by using an intensifying screen and an X-ray photographic film. In Table 1, a grade of B means graininess substantially equal to that of the image obtained by conventional X-ray photography using the intensifying screen and photographic film; a grade of A means superior graininess. A grade of C means rather coarse graininess and a grade of D means markedly coarse graininess.

Evaluation results of the radiographic image conversion panels are shown in Table 3.

TABLE 3

| Panel | Sensitivity | Sharpness | Graininess |
|---|---|---|---|
| Example 1 | 107 | 109 | A |
| Example 2 | 108 | 111 | A |
| Example 3 | 111 | 115 | A |
| Example 4 | 109 | 104 | B |
| Example 5 | 106 | 103 | B |
| Example 6 | 111 | 104 | A |
| Example 7 | 107 | 113 | A |
| Example 8 | 109 | 109 | A |
| Example 9 | 110 | 113 | A |
| Comp. Example 1 | 100 | 100 | B |

TABLE 3-continued

| Panel | Sensitivity | Sharpness | Graininess |
|---|---|---|---|
| Comp. Example 3 | 76 | 82 | D |
| Comp. Example 4 | 80 | 75 | B |
| Comp. Example 5 | 102 | 95 | D |

As can be seen from the results, it was proved that Examples according to the present invention exhibited superior image characteristics of sensitivity, sharpness and graininess.

What is claimed is:

1. A method for preparing a rare earth activated alkaline earth metal fluorohalide stimulable phosphor represented by the following formula (I):

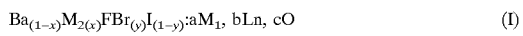

$$Ba_{(1-x)}M2_{(x)}FBr_{(y)}I_{(1-y)}:aM_1, bLn, cO \qquad (I)$$

wherein $M_1$ is at least an alkali metal selected from the group consisting of Li, Na, K, Rb and Cs; $M_2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are values meeting the following conditions:

$$0 \leq x \leq 0.3,\ 0 \leq y \leq 0.3,\ 0 \leq a \leq 0.05\ 0 < b \leq 0.2\ \text{and}\ 0 \leq c \leq 0.1,$$

the method comprising the steps of (a) preparing a reactant solution having a barium concentration of not less than 3.3 mol/l in a reaction vessel, (b) forming a precursor of the stimulable phosphor, (c) removing a solvent from a mother liquor, (d) separating the precursor from the mother liquor, and (e) calcining the separated precursor to make a rare earth activated alkaline earth metal fluorohalide stimulable phosphor.

2. The method of claim 1, wherein in step (c), a ratio by weight of the mother liquor after removal of the solvent to that before removal of the solvent is not more than 0.97.

3. The method of claim 1, wherein step (c) comprises (i) heating the mother liquor in combination with (ii) maintaining the inside of the reaction vessel under reduced pressure, (iii) allowing a dry gas to pass through the reaction mixture or (iv) forming a wetted wall of the solvent.

4. The method of claim 1, wherein step (c) comprises removing the solvent from the mother liquor, while maintaining the inside of the reaction vessel under reduced pressure.

5. The method of claim 1, wherein step (c) comprises removing the solvent from the mother liquor, while allowing a dry gas to pass through the reaction mixture.

6. The method of claim 1, wherein step (c) comprises removing the solvent from the mother liquor, while forming a wetted wall of the solvent.

7. The method of claim 1, wherein in step (a), the reactant solution has been added with an alkali metal halide in advance.

8. The method of claim 1 wherein (a) said preparing the reactant solvent comprises adding $BaI_2$ and a halide of Ln to the reactant solution, provided that when "x" of the formula (I) is not zero, a halide of M2 is further added thereto and when "y" of the formula (I) is not zero, $BaBr_2$ is further added and when "a" of the formula (I) is not zero, a halide of $M_1$ is further added thereto;

(b) said forming the precursor comprises adding a solution containing 5 mol/l or more of an inorganic fluoride into the reactant solution while maintaining a temperature at 50° C. or more to form a crystalline precipitate of the precursor; and (c) said removing the solvent from a mother liquor is conducted while or after adding the inorganic fluoride.

9. The method of claim 2, wherein the ratio by weight of the mother liquor after removal of the solvent to that before removal of the solvent is 0.5 to 0.95.

10. The method of claim 1, wherein the barium concentration is not more than 5.0 mol/l.

11. The method of claim 8, wherein in step (b), the temperature is maintained at 80 to 100° C.

12. The method of claim 8, wherein in step (e), the separated precipitate of the precursor is calcined at a temperature of 400° to 1300° C. for a period of 0.5 to 12 hrs.

13. The method of claim 8, wherein in step (b), an inorganic fluoride solution of 5 to 15 mol/l is added.

14. The method of claim 8, wherein in step (b), an inorganic fluoride solution of 12 to 15 mol/l is added.

15. The method of claim 1, wherein in step (c), the solvent is removed at a rate of 2.0 to 20.0 kg/m²·hr.

16. The method of claim 10, wherein in step (c), the solvent is removed at a rate of 2.0 to 20.0 kg/m²·hr.

17. The method of claim 11, wherein in step (b), an inorganic fluoride solution of 12 to 15 mol/l is added; in step (c), the solvent is removed at a rate of 3.0 to 10.0 kg/m²·hr; in step (e), the separated precipitate of the precursor is calcined at a temperature of 400° to 1300° C. for a period of 0.5 to 12 hrs.

18. The method of claim 16, wherein the solvent is removed at a rate of 3.0 to 10.0 kg/m²·hr.

19. The method of claim 18, wherein the precursor is comprised of particles having an average size of 1 to 10 μm.

20. A method for preparing a radiographic image conversion panel comprising providing a phosphor layer on a support, the phosphor layer containing a rare earth activated alkaline earth metal fluorohalide stimulable phosphor prepared by the method as claimed in claim 1.

* * * * *